United States Patent

Paine et al.

[15] 3,637,170
[45] Jan. 25, 1972

[54] SPACECRAFT ATTITUDE CONTROL METHOD AND APPARATUS

[72] Inventors: Thomas O. Paine, Administrator of the National Aeronautics and Space Administration with respect to an invention of; Thomas R. Kane, Stanford University; Mark P. Scher, Palos Verdes Peninsula, both of Calif.

[22] Filed: Dec. 31, 1969

[21] Appl. No.: 889,551

[52] U.S. Cl. .................................................244/1 SA
[51] Int. Cl. .................................................B64g 1/00
[58] Field of Search ..................244/1 SS, 1 SA, 32; 74/5

[56] References Cited

UNITED STATES PATENTS

| | | | |
|---|---|---|---|
| 3,312,422 | 4/1967 | Simmons et al. | 244/1 SA |
| 3,341,151 | 9/1967 | Kampinsky | 244/1 SA |
| 3,414,214 | 12/1968 | Robinson et al. | 244/1 SA |

Primary Examiner—Milton Buchler
Assistant Examiner—Jeffrey L. Forman
Attorney—Darrell G. Brekke and G. T. McCoy

[57] ABSTRACT

A method and apparatus are described for controlling the attitude motions of a spacecraft or other artificial body moving in space by causing certain components thereof to perform prescribed motions relative to one another so as to convert the initial motion of the spacecraft into one of simple rotation. The system includes a means for sensing the instantaneous motion of the body, means for computing the necessary relative motion between components to achieve the desired attitude motions, and means for physically implementing the required relative motion. The computing means may either be carried in the moving body or be remote and communicatively linked to the sensing and controlling apparatus.

10 Claims, 6 Drawing Figures

PATENTED JAN 25 1972
3,637,170
SHEET 1 OF 3
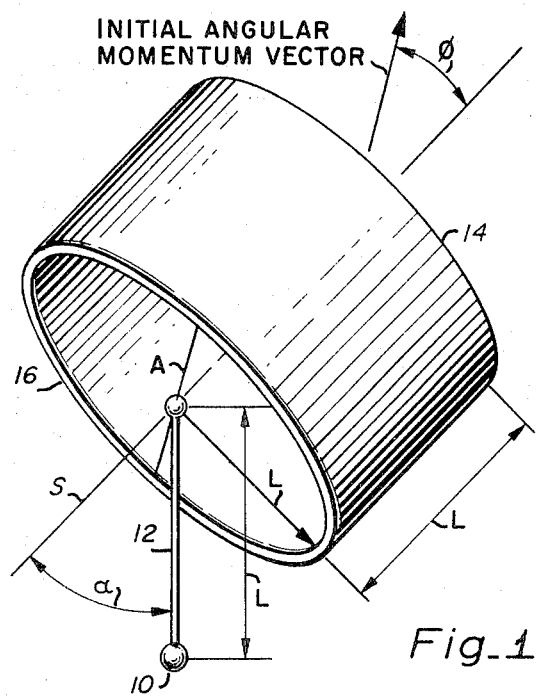
Fig_1
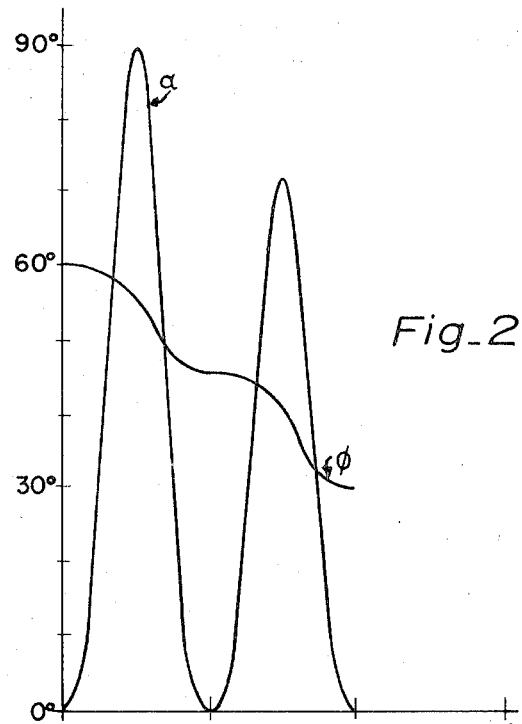
Fig_2
INVENTORS
THOMAS R. KANE
BY  MARK P. SCHER
ATTORNEYS

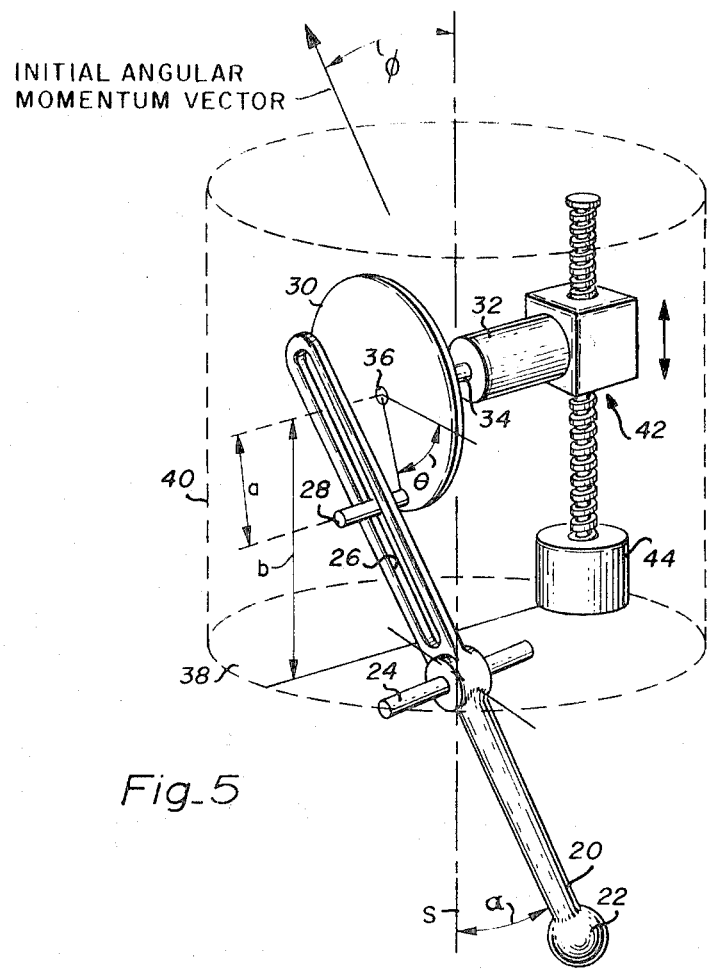
Fig_5
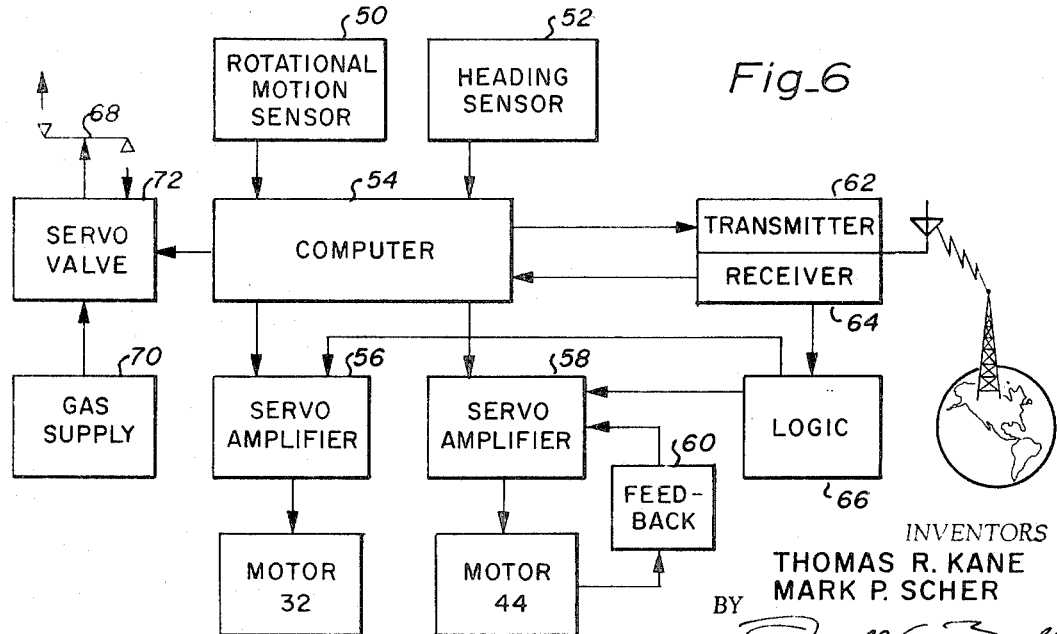
Fig_6
INVENTORS
THOMAS R. KANE
MARK P. SCHER
BY
ATTORNEYS

SPACECRAFT ATTITUDE CONTROL METHOD AND APPARATUS

BACKGROUND OF THE INVENTION

The present invention relates generally to the control of space vehicles and, more particularly, to a method and apparatus for controlling the attitude motions of a space vehicle by conversion of its initial motion into either a simple rotation or a precession without nutation, by a programmed movement of parts relative to each other.

One of the primary problems involved in the control of a space vehicle as it moves through space relates to the manner in which its attitude can be controlled, and a number of different methods of control have been developed previously and have been used to eliminate undesirable tumbling or nutation of spacecraft. As one example, the well-known nutation damper is frequently used to remove nutation of the body and leave it spinning about its axis of maximum inertia.

The many systems that have been proposed for utilization in the control of a space vehicle either in deep space or in orbit about a planetary body all suffer from inherent limitations and, as a result of the peculiar environmental conditions found in outer space, may prove unsuitable for certain missions. For example, a spacecraft's orientation has been controlled by means of rockets mounted on the periphery of the vehicle, the operation of which can be controlled by various means. It is well recognized that the problem of precisely controlling vehicle angular orientation within limits of small fractions of a degree by such a method presents a serious problem.

Other schemes for controlling the orientation of a rotating body have involved the use of yo-yo type devices, which are designed to vary the rotational speed, as well as gyroscopic or rotating mass devices, which can alter both the rotational speed and the attitude of a spacecraft.

The present invention differs substantially from the prior art attempts at spin axis orientation control in that it enables precise control and permits relatively rapid changes of the nutation angle of symmetric vehicles to any desired value. Using the present invention, it is also possible to control the motion of an asymmetric body so that it ultimately spins about either its axis of minimum or maximum centroidal moment of inertia, and this is accomplished by varying the relative orientation of the parts of the vehicle, i.e., by moving parts of the spacecraft relative to each other and then returning them to their initial relative positions.

The effects of energy changes on attitude motions of space vehicles have been the subject of numerous investigations, most of which are concerned with dissipation, and hence decreases, of energy. The present invention involves a method of active attitude control in which both energy increases and decreases are induced for the express purpose of modifying attitude motions.

OBJECTIVES OF THE INVENTION

It is therefore a primary purpose of the present invention to provide a novel method and apparatus for controlling the spin axis orientation of a vehicle in space.

Another objective of the present invention is to take advantage of the theoretical possibility of letting parts of the craft be moved relative to each other and then returning them to their initial relative position for the purpose of controlling spin axis orientation.

Still another object of the present invention is to provide a novel method and apparatus for simultaneously causing the parts of a vehicle to assume precalculated positions relative to each other and to reorient the spin axis thereof.

SUMMARY OF THE INVENTION

The present invention comprises a method and apparatus for providing active attitude control for a spacecraft by converting any attitude motion of the vehicle into simple rotational motion. This is accomplished by changing the relative positions of at least two component parts of the system during a predetermined portion of its motion. One of the parts could, for example, be an antenna pivotally mounted on the spacecraft. Alternatively, the attitude control apparatus may take the form of a "black box" attached to the spacecraft, the "box" containing sensors for determining the state of motion of the spacecraft at a given instant, movable parts whose motion brings about the desired attitude changes, and a power source for driving the movable parts.

Among the advantages of the present invention over known methods and devices are low-energy and power requirements, alleviation of fuel supply problems, and elimination of questions of saturation encountered with reaction wheels and control moment gyroscopes. The possible variations and modifications of the present invention are practically unlimited as regards choice and arrangement of components. The basic theory underlying the operation of the device is the same, no matter what components are used.

Other advantages of the present invention will become apparent to those skilled in the art after they have read the following detailed disclosure which makes reference to several drawings.

DRAWINGS

FIG. 1 is a simplified illustration of a symmetrical body to which a second body is attached in such a way as to permit rotation of the second body about an axis fixed in the first body.

FIGS. 2, 3 and 4 are time diagrams showing the time histories of the angles $\phi$ and $\alpha$ of FIG. 1 during typical operations of the present invention.

FIG. 5 is a simplified diagram showing a possible manner in which the two bodies may be selectively positioned relative to one another.

FIG. 6 is a block diagram of a control system for controlling the bodies illustrated in FIG. 5 in accordance with the present invention.

DESCRIPTION OF THE INVENTION

Figure 3:
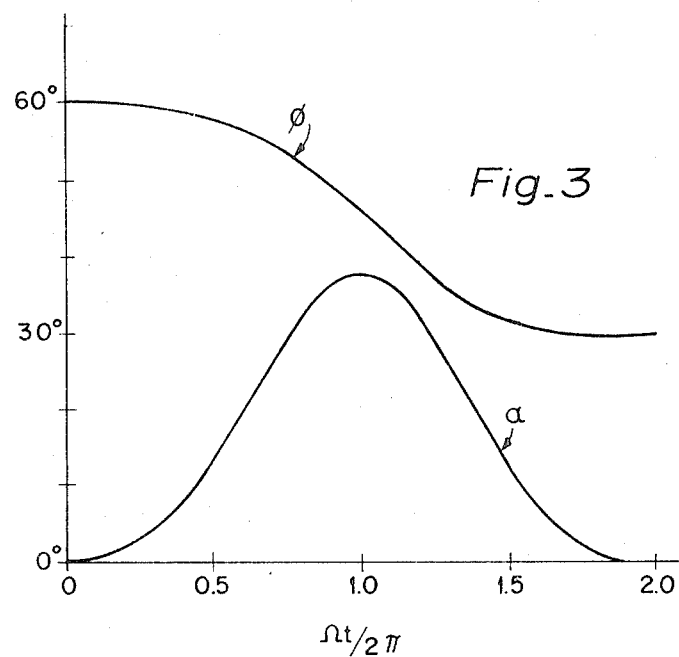

This discussion of the present invention applies to systems comprised of particles and rigid bodies which are subject to the action of forces whose resultant moment about the system's mass center is equal to zero. The components of the system are presumed to be able to perform prescribed relative motions. In particular, it is assumed that the system can move as a quasi-rigid body, i.e., that all of its parts can be made to remain at rest relative to each other.

When such a system moves as a quasi-rigid body, the inertial angular velocity of this body, in general, has neither a constant magnitude nor a fixed direction. In other words, the body does not, in general, simply spin. However, simple spins are possible in principle. That is, a rigid body can move in such a way that the orientation of one of its principal axes remains fixed in space. The following question thus arises. How, if at all, can parts of the system be moved relative to each other, and ultimately returned to their original relative positions, in order to convert a given attitude motion of the quasi-rigid body, for example, an undesirable tumbling or nutation, into a simple spin? The answer is that the parts must be moved so as to exploit the following three facts:

I. Whenever the system moves as a quasi-rigid body, the rotational kinetic energy $K$ lies between two values, $K_1$ and $K_2$, which depend on the constant magnitude H of the angular momentum of the system relative to the mass center, and on the maximum and minimum centroidal moments of inertia, $I_1$ and $I_2$, respectively. More specifically, (1) $K_1 \leq K \leq K_2$ where $K_1$ and $K_2$ are defined as (2) $K_1 = H^2/2I_1$ and (3) $K_2 = H^2/2I_2$ II. If the system moves as a quasi-rigid body and $K=K_1$ or $K=K_2$ at some instant of time $t$, then the angular velocity is parallel to a body-fixed principal axis at $t$.

III. If the system moves as the same quasi-rigid body prior to an instant $T_1$ and subsequent to an instant $t_2$, but the parts of the system are made to move relative to each other during the time interval $t_2-t_1$, then, depending on the particular relative motions performed, the value of $K$ at time $t_2$ can be greater than, less than, or equal to the value of $K$ at $t_1$.

It should be noted that from statement II and from the fact that $K$ remains constant whenever the system moves as a quasi-rigid body, it follows that the angular velocity vector remains fixed in magnitude and direction relative to the quasi-rigid body subsequent to an instant of time $t$ at which $K=K_1$ or $K=K_2$. Now, if the angular velocity remains fixed relative to the body, then it also remains fixed in space, and the orientation in inertial space of a body-fixed principal axis therefore remains unchanged. In other words, the body performs a simple spinning motion subsequent to an instant of time $t$ at which $K=K_1$ or $K=K_2$.

Considering the statements of paragraphs I and III, it can be deduced that, in order to convert any quasi-rigid body motion into a simple spin, the parts of the moving system should be made to move relative to each other in such a way that $K$ decreases to $K_1$, or increases to $K_2$, and the parts of the system return to their initial relative positions at the instant at which $K$ acquires one of these values.

If $I_3$ denotes the intermediate centroidal moment of inertia of a rigid body and $\omega_1$, $\omega_2$ and $\omega_3$ are the measure numbers of the angular velocity referred to correspondingly numbered body-fixed principal axes, then $H^2$ and $K$ can be expressed as (4) $\quad H^2 = I_1^2\omega_1^2 + I_2^2\omega_2^2 + I_3^2\omega_3^2$ and (5) $\quad K = 1/2(I_1\omega_1^2 + I_2\omega_2^2 + I_3\omega_3^2)$ so that, referring to equations (2) and (3) and using equation (4) to eliminate $\omega_1$ from equation (5), one can express $K$ as (6) $\quad K = K_1\left[1 + \frac{I_2(I_1-I_2)\omega 2^2 + I_3(I_1-I_3)\omega 3^2}{H^2}\right]$ whereas elimination of $\omega_2$ leads to (7) $\quad K = K_2\left[1 + \frac{I_3(I_1-I_3)\omega 3^2 + I_1(I_2-I_1)\omega 1^2}{H^2}\right]$ Since by hypothesis $$I_1 \geq I_3 \geq I_2$$

equations (6) and (7) lead directly to equation (11), which verifies statement I; and statement II follows from the observations that, with (9) $\quad I_1 > I_2$ as has been postulated, equation (6) requires that both $\omega_2$ and $\omega_3$ vanish when $K=K_1$, while equation (7) shows that $\omega_3$ and $\omega_1$ are equal to zero when $K=K_2$. Finally, as regards statement III, it is unnecessary to adduce a formal proof, but it should be noted that full recognition of the potential utility of the facts stated in statement III is the primary basis of the present invention, since the principles of statements I and II have, of course, been used extensively in connection with passive attitude control systems.

An interesting and perhaps practically important special class of situations arises when the system under consideration can move as a symmetric quasi-rigid body, that is, a body such that $I_3$ is equal to $I_1$ or $I_2$. The kinetic energy $K$ then not only furnishes a guide in the selection of maneuvers that lead to a simple spinning motion, but can be used to devise a method for converting the motion into a combination of precession and spin in which the angle $\phi$ between the axis of symmetry and the space-fixed angular momentum vector takes on any preassigned value. This may be seen as follows: Suppose that

(10) $\quad I_3 = I_2$ so that the "1" axis is the axis of symmetry. Then the angle $\phi$ between this axis and the angular momentum vector satisfies the equation

(11) $\quad \cos^2\phi = (I_1\phi_1/H)^2$ and substitution from equations (3), (10), and (11) into equation (7) gives

(12) $\quad K = K_2\left[1 + \left(\frac{K_1}{K_2}-1\right)\cos^2\phi\right]$

Similarly, if $I_3=I_1$, that is when the "2" axis is the symmetry axis, $K$ is given by

(13) $\quad K = K_1\left[1 + \left(\frac{K_2}{K_1}-1\right)\cos^2\phi\right]$

As the most general torque-free motion of a symmetric rigid body is a combination of precession and spin during which $\phi$ remains constant, the desired results can be obtained by using any relative motion which changes the kinetic energy to one of the values given by equations (12) or (13) and which restores the system to its initial quasi-rigid state at the instant at which $K$ acquires this value.

As an example, the system illustrated in FIG. 1 can be considered. This system includes a particle 10 of mass M which is attached by means of a light rod 12 of length L to a solid uniform right circular cylinder 14 of mass 10 M, radius L, and height L. The rod 12 is constrained to rotate in a prescribed manner relative to the cylinder 14 and about an axis A that is perpendicular to the axis of symmetry S of the cylinder 14. When this system moves as a quasi-rigid body with $\alpha=0$, S is the axis of minimum moment of inertia, and $I_1$, $I_2$ and $I_3$ have the values

(14) $\quad I_1 = I_3 = 5.38\ ML^2$ and

(15) $\quad I_2 = 5ML^2$

In order to assign to $H$ a value with readily apparent physical significance, consider first a motion during which the angular velocity vector is parallel to the symmetry axis and has a magnitude $\Omega$. $H$ then has the value

(16) $\quad H = 5ML^2\Omega$

Suppose now that $H$ has the value given by equation (16), but that the system is actually moving in such a way that S remains inclined at 60° to the angular momentum vector (and $\alpha$ remains equal to zero). How can one then vary the angle $\alpha$ so as to convert this motion into one during which the angle between S and the angular momentum vector is equal to, say, 30°? To answer this question $K_1$ and $K_2$ can be evaluated by substituting from equations (14), (15) and (16) into equations (2) and (3). Then equation (13) can be used with $\phi=60°$ to obtain the initial kinetic energy

(17) $\quad K_i = 2.37ML^2\Omega^2$ and with $\phi$ equal to 30°, which yields the desired final kinetic energy

(18) $\quad K_f = 2.46ML^2\Omega^2$

Next, deciding arbitrarily to make the rod 12 move in accordance with the equation

(19) $\quad \alpha = N\pi/2 \sin^3(\Omega t)$ where $N$ is a constant, and taking $t=0$ at the instant when the axis of rotation A of the rod 12 lies in the plane defined by S and the angular momentum vector, integrations of the equations of motion of the system for various values of $N$ can be performed using a digital computer until a value has been found such that $|K=K_f|$ at $t=(\pi/\omega)$ (i.e., at the end of one oscillation of the rod 12) is smaller than $|K_i - K_f|$. The values of all variables at $t=(\pi/\omega)$ are then taken as initial values, a new search for $N$ is undertaken, and this process is continued until $|K-K_f|$ has been reduced to a value that is regarded as sufficiently small. Two values of $N$ obtained in this fashion are $N=1.0$ and $N=0.8$; and $\phi$ is equal to 30.1° at the end of the second oscillation of the rod 12. The time histories of $\alpha$ and $\phi$ for this maneuver are depicted in FIG. 2 of the drawing. A solution requiring more time, but only one oscillation of rod 12, and that one having an amplitude of only 38°, is obtained when equation (19) is replaced with

(20) $\quad \alpha = (N\pi/2)\sin^3(\Omega t/4)$

The $\alpha$ and $\phi$ time history curves for this case are shown in FIG. 3 of the drawing.

Figure 4:
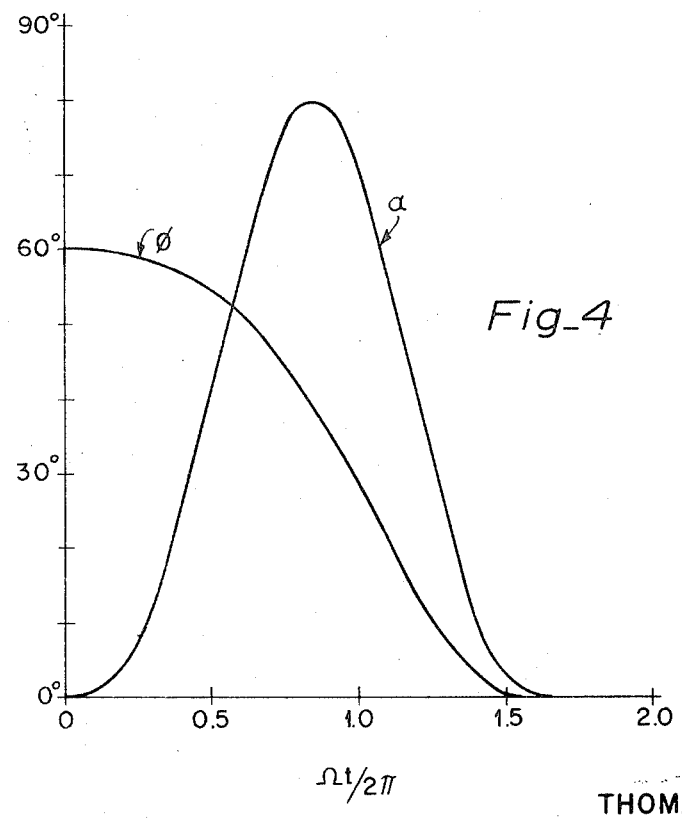

Finally, a conversion of the initial motion into a simple rotation about the axis of minimum moment of inertia, i.e., a reduction of $\phi$ from 60° to 0°, is illustrated in the diagram shown in FIG. 4 of the drawing.

It may appear that the present attitude control scheme requires elaborate computational facilities. This is not necessarily true. For example, in the case of a symmetric vehicle for which the desired final value of $\phi$ is known prior to launch, a catalogue of functions $\alpha(t)$ suitable for use with particular initial values of $\phi$ can be compiled prior to launch. When the vehicle is subsequently in flight, an initial value of $\phi$ can be found by simple algebraic operations involving only moments of inertia and instantaneous values of $\omega_1$, $\omega_2$ and $\omega_3$. The required $\alpha(t)$ can then be selected from the catalogue without further computation.

In any event, computational complexity may be a price which one is willing to pay for such desirable features as low-energy and power requirements, alleviation of fuel supply problems, and elimination of the difficulties associated with saturation which arise in reaction wheel and control moment gyroscope attitude control systems.

The present concept of attitude control is quite independent of the particular mechanical systems selected for implementation. The principal requirement is that the space vehicle be comprised of at least two rigid parts which can perform prescribed relative motion. One example of such a system is a cylindrical spacecraft, such as is illustrated in FIG. 1, with a pendulous mass 10 pivotally attached to the center of the face 16. The pendulum can perform prescribed oscillations about the axis A which are described by the angle $\alpha$ between the connecting rod 12 and the symmetry axis S of the spacecraft 14. When the system moves as a quasi-rigid body, $\alpha$ is equal to zero.

The system can be driven by a mechanism such as that illustrated in FIG. 5, wherein it is seen that the rod 20 carrying the body 22 extends beyond the pivot point 24 and has a slot 26 cut in the extension thereof for receiving the pin 28. The pin 28 is rigidly attached to a disc 30 which is driven by a motor 32 via a shaft 34. The pin 28 is radially spaced from the center 36 of the disc 30 by a distance $a$, and the center point 36 is located a distance $b$ from the base plane 38 of the spacecraft 40 in which the pivot pin 24 lies. The distance $b$ can be controlled by mounting the motor 32 to a jackscrew arrangement 42 which is driven by a second motor 44.

The line $a$ between the pin 28 and center 36 of disc 30 makes an angle $\theta$ with the face 38 of the spacecraft 40, and $\theta$ can be controlled as a function of time by the motor 32. When the system moves as a quasi-rigid body, $\theta$ must be zero or a multiple of $2\pi$. When the disc 30 makes one revolution about the point 36, the angle $\alpha$ is driven through one oscillation. The geometry of the system is such that $$(21) \quad \alpha(t) = \arctan\left(\frac{1-\cos\theta}{\eta+\sin\theta}\right)$$

where $n=(b/a)$ and the maximum value of $\alpha$ is given by the expression $$(22) \quad \alpha_{max} = \arctan\left(\frac{2\eta}{\eta^2-1}\right)$$

Thus, the amplitude of oscillation of the pendulum 22 is controlled by the choice of the distance b, and the period of oscillation depends upon $\theta(t)$. The control problem is to find a function $\theta(t)$ and a value of $b$ appropriate for given initial values of the angular rates of the spacecraft 40.

The energy requirements for any apparatus based on the concept under consideration depend on (1) the design of the spacecraft, (2) its initial motion and (3) the desired final attitude motion. If the maximum and minimum centroidal principal moments of inertia of a quasi-rigid system are $I_1$ and $I_2$ respectively, and $A_1$ and $A_2$ designate the corresponding principle axes, and if the desired final attitude motion is simple spin about the axis $A_2$, then the energy required to convert any initial motion to simple spin may be as large as $$\frac{H^2}{2}\left(\frac{1}{I_2}-\frac{1}{I_1}\right),$$

where $H$ is the magnitude of the angular momentum. This energy cost is associated with initial spin about $A_1$. If the spacecraft is launched with the same momentum and with any other attitude motion, then the cost is reduced. Clearly, energy cost can also be reduced by releasing the spacecraft with as little angular motion as possible, thus keeping $H^2$ small. Finally, by designing the spacecraft so that $I^1$ and $I_2$ are nearly equal, i.e., that the quasi-rigid spacecraft is nearly spherical, the energy cost may be kept low.

On the other hand, it is more likely that the desired final motion will be spin about $A_1$. Then electrical energy may be generated rather than expended. The energy cannot exceed $$\frac{H^2}{2}\left(\frac{1}{I_2}-\frac{1}{I_1}\right),$$

and the remarks concerning initial motion and design apply in reverse. For instance, designing the spacecraft to obtain a larger difference between $I_1$ and $I_2$ will increase the energy required when the control system alters the attitude motion to spin about $A_1$.

Referring now to FIG. 6 of the drawing, a sensing and control system in accordance with the present invention is illustrated in block diagram form. The system includes a rotational motion sensor 50 and a heading sensor 52. The sensor 50 is capable of sensing rotation of the spacecraft about any of the three axes and may, for example, include three, single axis gyros or three accelerometers. The heading sensor 52 detects the heading or direction of travel of the spacecraft and may take the form of a star tracking device, a sun tracking device, a horizon sensing means or an inertial guidance mechanism.

The output signals generated by these two sensors are coupled into a computer 54 which may be preprogrammed to cause the spacecraft to follow a predetermined heading. In such case, the computer determines precisely the inputs which must be supplied to the motors 32 and 44 (see FIG. 5), respectively, in order to cause a required change in the attitude of the spacecraft. The motor control outputs are fed to the motors through suitable servoamplifier means 56 and 58. And since the motor 44 drives a jackscrew-type drive mechanism, some type of feedback means 60 is required to permit proper control thereof.

In addition, it may be found desirable to transmit some or even all of the sensor data back to earth or some other spacecraft where more rapid or complex computations could be carried out. In such case, the computer 54 will couple the necessary data into a transmitter 62 which will communicate the data to the remote system. The return information will be received by the receiver 64 and communicated to the computer 54 for enabling the spacecraft to be controlled in response thereto. Moreover, there may be an occasion where the remote station will wish to directly energize the motors 32 and 44 while the computer 54 is performing other functions. To accommodate such direct control suitable logic circuitry 66 may be provided for directly energizing the motors in response to signals received by receiver 64.

Since the fundamental operation of the present invention depends on the spacecraft's having at least some spin and the rate of attitude change may depend on the amount of spin, a pair of jets 68 are provided which may be used to impart a spin movement to the spacecraft about one of its axes. A gas supply means 70 provides gas to the jets 68 through a servo-controlled valve 72 which is controlled by an output from the computer 54.

In summary it can be said that the present invention includes an active system capable of utilizing motions of parts of the vehicle to obtain rotation of the entire system about a principal axis of the vehicle. The control method does not depend upon external effects except for the purpose of determining the motion of the vehicle, as by star trackers, inertial platforms, etc. For the example shown in FIG. 5, the connecting rod 20 between the spacecraft 40 and the pendulus mass 22 is commanded to move in a precalculated manner and the resulting variations in the inertial properties of the vehicle lead to rotation about a preferred axis and/or reorientation of the axis of the vehicle relative to inertial space.

In accordance with the present invention, the spacecraft may be reoriented relatively rapidly, in some cases, within the time required for two rotations of the vehicle, and power requirements can be kept very small if the system mechanisms are arranged to operate at high efficiency. Only the following is required for a complete system: Two or more rigid bodies, one of which may be the spacecraft proper and the other a boom or even an antenna; an attitude sensing device, which can take the form of a gyro, an accelerometer, or a star sensor; and means for moving one of the rigid bodies in a predetermined manner relative to the other bodies.

Because determination of the relative motions which are to be employed in response to a given change in spacecraft attitude involves a trial and error process, a computer is necessary and can either be carried on board or be included as a ground unit connected by a two-way radio link to the onboard position sensors or may be a combined system as described above. To speed up the computing process, foreseeable problems may be solved in advance and the solutions stored for ready access. The calculations are made much easier if the design of the spacecraft is cylindrical.

Although the invention has been described and illustrated in terms of a particular scheme for implementation, it is to be clearly understood that the same is by way of illustration and example only and is not to be taken by way of limitation. The primary feature of the present invention resides in the recognition and application of the theory that the initial motion of a body moving in space can be converted into simple rotation about the axis of minimum or maximum moment of inertia by a programmed movement of parts thereof relative to each other. Accordingly, it is intended that the spirit and scope of this invention are to be limited only by the terms of the appended claims.

What is claimed is:

1. Space vehicle control apparatus for converting tumbling or nutation motion to simple spin motion comprising:
    a space vehicle having two component parts that are selectively movable with respect to each other, said space vehicle having an axis of symmetry when said parts assume a reference position;
    means for sensing the state of motion of said vehicle;
    means for computing the relative motion between said component parts and the duration of said relative motion required to fix the vector of the angular velocity of the vehicle parallel to a principal moment of inertia axis; and
    means responsive to said computing means for causing the required relative motion between said component parts.

2. Apparatus as set forth in claim 1 wherein one of said component parts comprises an elongated member that is pivoted to said other component part on said axis of symmetry.

3. Apparatus as set forth in claim 1 wherein one of said component parts is a pendulum pivoted to said other component part at said axis of symmetry, said pendulum oscillates in a plane containing said axis of symmetry and the swing of said pendulum is variable as well as the number of oscillations.

4. Apparatus as set forth in claim 3 wherein the oscillations of said pendulum are initiated and concluded from said reference position.

5. Control apparatus for a nutating space vehicle comprising:
    a space vehicle having first and second parts that may be programmably moved with respect to each other, said space vehicle having an axis of symmetry when said parts assume a reference position;
    means for oscillating said second part with respect to said first part a specific period to change the rotational kinetic energy of said space vehicle to $$K = K_1 \left[ 1 + \left( \frac{K_2}{K_1} - 1 \right) \cos^2 \phi \right]$$

where $\phi$ equals the desired angle between the angular momentum vector and said axis of symmetry and $$K_1 = (H^2/2I_2)$$

$$K_2 = (H^2/2I_2)$$

where $H$ is the magnitude of the angular momentum, and $I_1$ and $I_2$ are the principal moments of inertia of said space vehicle.

6. Apparatus as claimed in claim 5 wherein said second part is an elongated member that is pivoted to said first part on said axis of symmetry.

7. Apparatus as claimed in claim 6 wherein when said second part moves with respect to said first part, it oscillates within a plane containing the axis of symmetry.

8. Apparatus as set forth in claim 7 wherein the angular excursion of said elongated member in said plane may be varied, and said elongated member begins and concludes its oscillations from said reference position.

9. The method of converting space vehicle nutation to simple spin motion in a space vehicle having a symmetrical axis comprising the steps of:
    providing as a component of said body a pendulous mass being selectively movable relative to the remainder of said body in a plane containing said symmetrical axis;
    sensing the state of motion of said space vehicle to determine the angle $\phi$ between the angular momentum vector and said symmetrical axis;
    oscillating said pendulous mass through a predetermined arc for a predetermined period to reduce $\phi$ to zero by changing the rotational kinetic energy of said space vehicle.

10. The method set forth in claim 9 wherein the final rotational kinetic energy for $\phi=$zero is $$K = K_1 \left[ 1 + \left( \frac{K_2}{K_1} - 1 \right) \cos^2 \phi \right]$$

where $$K_1 = (H^2/2I_1)$$

$$K_2 = (H^2/2I_2)$$

and $H$ is the magnitude of the angular momentum, and $I_1$ and $I_2$ are the principal moments of the inertia of said space vehicle.

* * * * *